United States Patent [19]

Aiuola et al.

[11] Patent Number: 4,611,455

[45] Date of Patent: Sep. 16, 1986

[54] CONTROL DEVICE FOR WELDING RODS IN PACKAGING MACHINES

[75] Inventors: Franco Aiuola; Luciano Nannini, both of Bologna, Italy

[73] Assignee: Emhart Corporation, Hartford, Conn.

[21] Appl. No.: 530,165

[22] Filed: Sep. 7, 1983

[30] Foreign Application Priority Data

Sep. 7, 1982 [IT] Italy ................................. 3522 A/82

[51] Int. Cl.⁴ ........................ B65B 51/14; B65B 51/26
[52] U.S. Cl. .................................... 53/373; 156/583.1
[58] Field of Search ....................... 16/84; 53/373, 562; 74/411, 565; 156/582, 583.1, 583.4, 583.8, 583.9; 493/189, 209

[56] References Cited

U.S. PATENT DOCUMENTS

| | | | |
|---|---|---|---|
| 3,279,150 | 10/1966 | Watts, Jr. et al. | 53/373 |
| 3,657,055 | 4/1972 | Nichols | 156/583.1 X |
| 4,295,922 | 10/1981 | Evers | 53/373 X |

*Primary Examiner*—Horace M. Culver
*Attorney, Agent, or Firm*—Alan N. McCartney

[57] ABSTRACT

In packaging machines using heat-sealable wrapping material it is important that the heat-sealing mechanism operates in synchronism with the rest of the machine under satisfactory sealing conditions. A control device for sealing bars (14, 15; 40, 41) disposed opposite one another is provided which reciprocates the bars (14, 15; 40, 41) towards and away from one another in phase with the packaging machine operation. The bars (14, 15; 40, 41), or a lever mechanism or mechanical linkage, have arms (16, 17; 54, 54a, 59, 59a) pivotted by integral pins (18, 19; 55, 55a, 56, 56a) with eccentric axes: second pins (19; 56, 56a) are pivotted on the frame and first pins (18; 55, 55a) are rotatable about the axis (80; 70) of the second pins (19; 56, 56a) on movement of arms (16, 17; 55, 54a, 59, 59a) in the closing, sealing phase. At least one pin (18; 56a) has an integral arm (31; 59a) acting on pneumatic means (32; 61) by rotation of first pin (18; 55, 55a) about second pin (19; 56, 56a) to control sealing pressure applied by sealing bars (40, 41) as they are closed.

5 Claims, 6 Drawing Figures

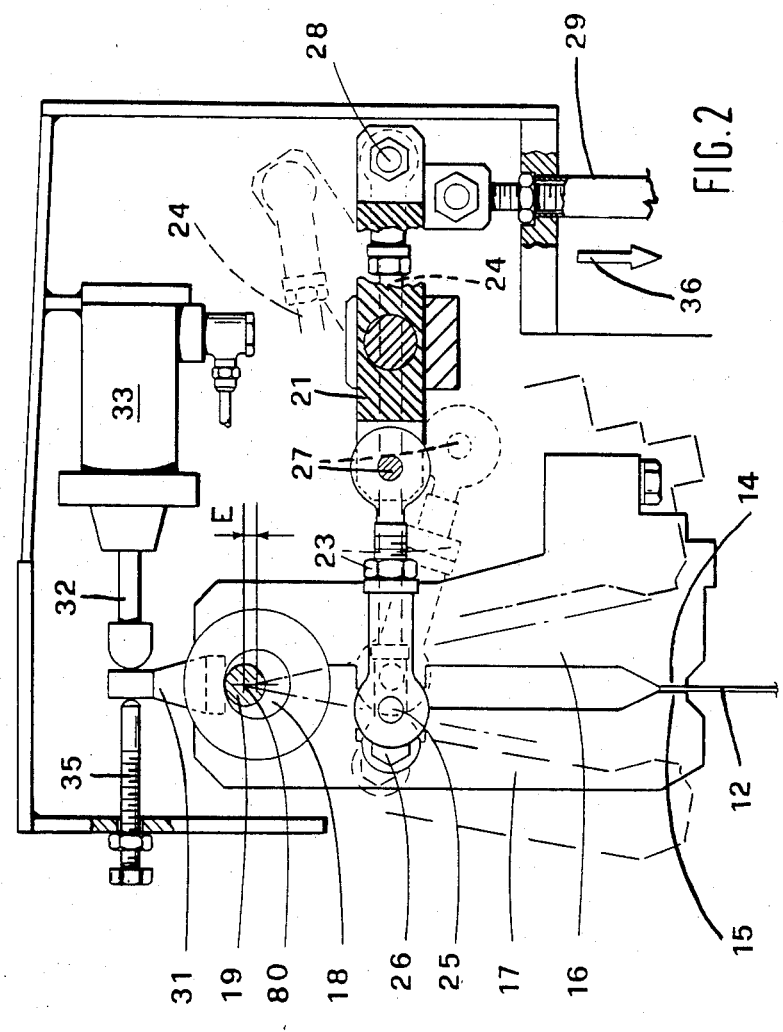

CONTROL DEVICE FOR WELDING RODS IN PACKAGING MACHINES

FIELD OF THE INVENTION

This invention relates to a control device for sealing bars (or welding rods) for machines for packaging products in wrappers of heat-sealable material.

BACKGROUND OF THE INVENTION

In the field of packaging machines for products, especially liquid products inside containers of heat sealable material, the operation of welding the material by which the containers are sealed is of fundamental importance. Liquid products may be packed, for example in "sachets" or "envelopes" formed from a composite material based on a thin sheet of aluminium and at least one plastic layer with heat-sealable properties. Usually the sealing operation is carried out by means of a pair of heated bars disposed one opposite the other between which material which is conveniently in the form of a strip unwinding from a bobbin and suitably folded longitudinally so as to present two edges parallel to each other is fed. The bars are pressed towards one another against this material with a force suited to the characteristics of the said material, in phase with the times when the feed line of the material used for forming the containers is stationary, the temperature of the sealing bars and the contact time between the sealing bars and the material to be sealed being synchronised with the operating speed of the packaging machine.

The quality of the sealing, on which the quality of the packaging depends, must be maintained in time with the machine rating, and above all even with the machine working production speeds different from the rating, and where, consequently, there is a variation in one of the elements forming the basis for the regulation of compression force applied by the sealing bars.

For the application of pressure by the sealing bars the use of springs (whose compression force is determined through the manual setting of purpose built adjusting ring nuts) is well known. (See U.S. Pat. No. 3,657,055) This means first of all that in order to vary the compression force applied by such sealing bars it is necessary for the operator to adjust each ring nut directly; this can require the machine to be stopped to allow the operator to carry out the adjustments. Furthermore this method is unsuitable where the machine is used with frequent changes in the production rate because the springs, set for certain operating speed of the machine, if not continually reset, as appropriate for the production rate changes can be the cause of an imperfect sealing.

According to another well known method, adjusting devices for the compression force applied by sealing bars use pneumatically controlled small pistons. (See U.S. Pat. Nos. 3,279,150 and 4,295,922). This method undoubtedly offers the possibility of easier adjustment of pressure of the sealing bars compared to the method using pressure springs; it does however have the inconvenience of not succeeding, with absolute reliability, in maintaining the phase of the operative cycle of the machine especially if there are continuous variations of production speed, with consequent adverse effect on the quality of the sealing.

OBJECTS OF THE INVENTION

One object of the present invention is that of obviating the above difficulties by providing a mechanical device with pneumatic control for the opening and closing of the sealing bars by means of which there is the possibility of varying, continuously and during the machine operation, the pressure applied by the sealing bars so as to obtain optimum sealing even with production rate variations of the packaging machine.

Another object of the present invention is that of supplying a control device of simple construction and therefore economic to produce and safe in its working, constructed so as to guarantee a satisfactory operation of the sealing bars even with the packaging machine working at different speeds.

SUMMARY OF THE INVENTION

The above and other objectives are achieved by providing a control deice for the sealing bars for machines for packaging products in wrappers of heat-sealable material comprising a lever or a mechanical linkage control mechanism for the opening and closing of at least two sealing bars, operating opposite one another, said mechanism acting cyclically on said sealing bars to cause a reciprocal forward and backward movement of the sealing surfaces of said bars, respectively in their closing or sealing phase, and in their subsequent opening in which the sealing bars, or the lever or mechanical linkage control mechanism includes at least two arms pivotted respectively on first and second pins which are secured to or integral with one another, whose axes are parallel but eccentric one in relation to the other, the second of said pins being pivotted on a frame structure of the device and the first of said pins being rotatable around the axis of the second pin consequent on the movement of said arms in the closing phase of the sealing bars, at least one of these pins having an integral arm acting on a pneumatically controlled damping means by rotation of the first pin around the axis of the second pin following the thrust of the control mechanism on the sealing bars as the sealing bars are closed.

With the device structured in this manner the pneumatically controlled means determines and allows the adjustment of pressure on the sealing bars. Such adjustment is possible by means of remote controls which can be positioned centrally so as to allow the operator to make adjustments without having to gain access to the interior of the device. This is particularly important in packaging machines which have various sealing stations, (to obtain, for example, the closing of the bottom and side and the sealing of a container) positioned along a packaging line which includes a plurality of other devices which would render the direct intervention by the operator on each control device for sealing bars for the various sealing devices installed extremely complex. Furthermore, by being able to centralise the adjusting devices for the pneumatically controlled damping means of more than one control device of the type which is the subject of the present invention, it is possible to regulate, even continuously, the pressure action of one or more pairs of sealing bars according to the operating conditions of the packaging machine, without having to resort to the stopping of the production cycle, with evident productivity benefits for the machine.

It will be noticed that, while envisaging a pneumatically controlled adjustment of the pressure action of the sealing bars, these are operated by a lever or mechanical linkage mechanism which can derive its movement from devices mechanically connected to the timing or drive shaft of a packaging machine, so as to ensure, in any condition of operating speed, a perfect operation of the sealing bars in relation to the movement and dwell times predetermined for the production cycle.

BRIEF DESCRIPTION OF THE DRAWINGS

There now follows a detailed description to be read with reference to the accompanying drawings, of control devices for sealing bars for a packaging machine embodying the invention. It will be realised that these devices have been selected for description to illustrate the invention by way of example.

In the accompanying drawings:

FIG. 2 is a diagrammatic view with parts broken away showing a bottom sealing device according to the invention, having scissor-type sealing bars;

DESCRIPTION OF THE PREFERRED EMBODIMENT

Figure 1:
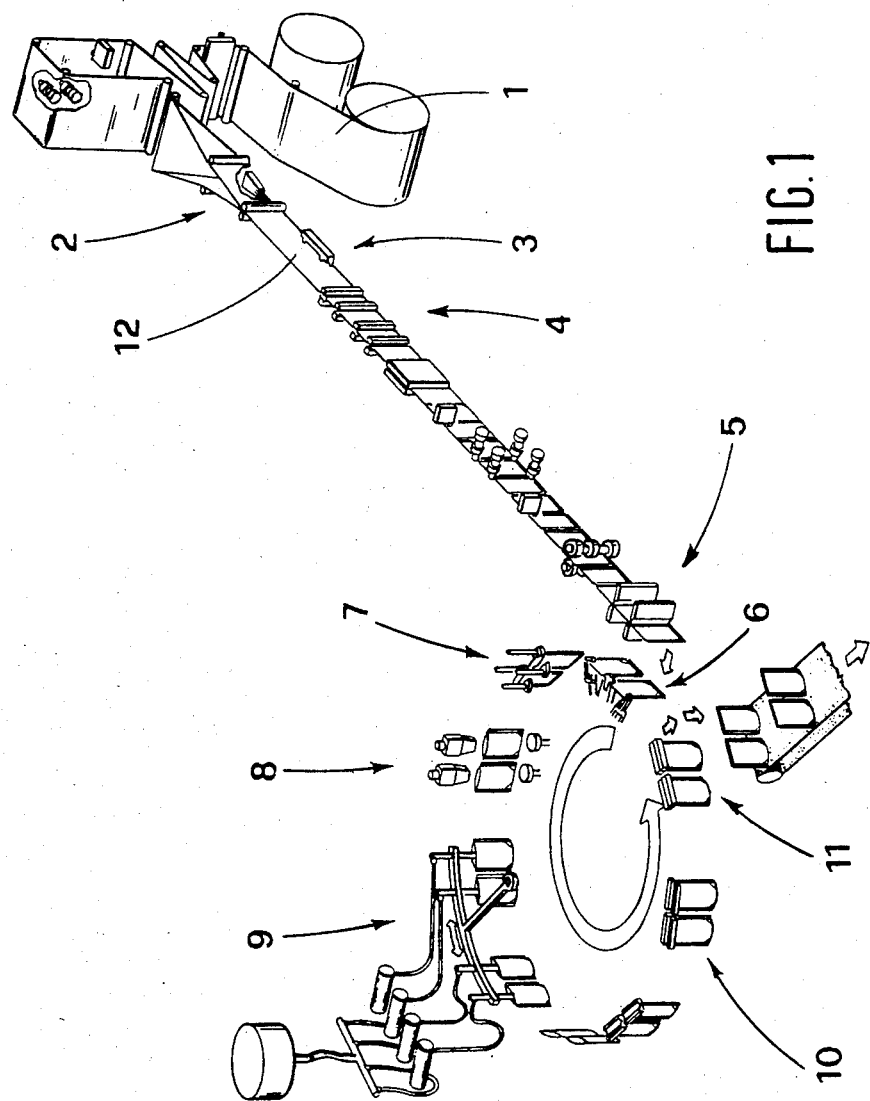
FIG. 1 is a diagrammatic view of a packaging machine having a plurality of stations at which control devices for sealing bars embodying the invention, are installed.

FIG. 1 shows a packaging machine for products, for example liquid products e.g. drinks, inside wrappings shaped like sachets or envelopes and produced from a strip 1 of heat-sealable material (e.g. of the combined aluminium-plastic material type).

This strip 1, at a folded station 2, is folding on itself for sealing at the bottom and the sides at appropriate sealing stations 3, 4 at which are disposed control devices embodying the invention; then the partially formed containers (open at the top) reach a cutting and separation station 5 and they are drawn into a station 6 of a rotating head, during rotation of which the following operations are carried out: opening of the sachets by means of feeding suckers at station 7, blowing air into sachets at station 8, filling the containers with the product at station 9, sealing of the upper opening (thus closing the containers) at station 10, and finally removal of the formed containers and sending them on to further packaging operations at station 11.

For further clarification it is pointed out that sealing bars 40, 41 at station 4 are moved with a linear forward and backward movement keeping the sealing bars parallel to each other, whilst sealing bars 14, 15 at station 3 and 10 move pivotally towards and away from one another with a scissor-like action.

Figure 4:
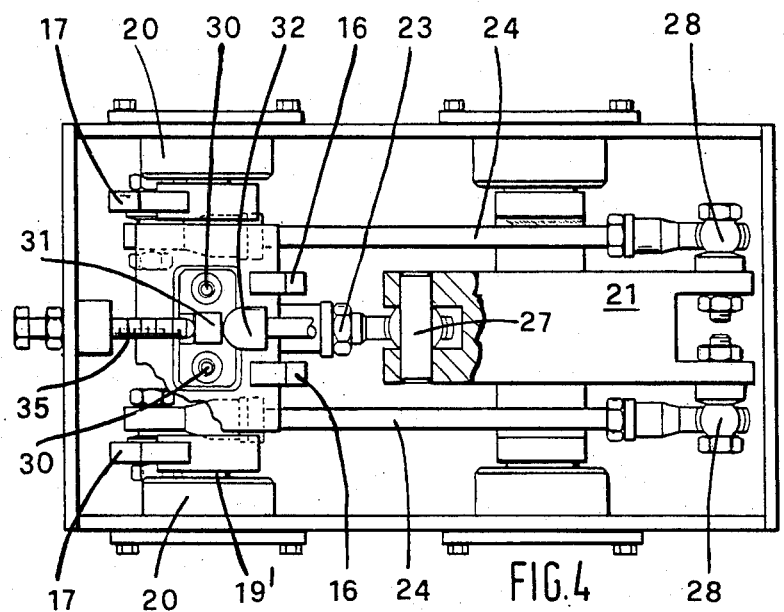
FIGS. 3 and 4 are, respectively, a front view and a plan view of the device shown in FIG. 2, with part broken away.
Figure 3:
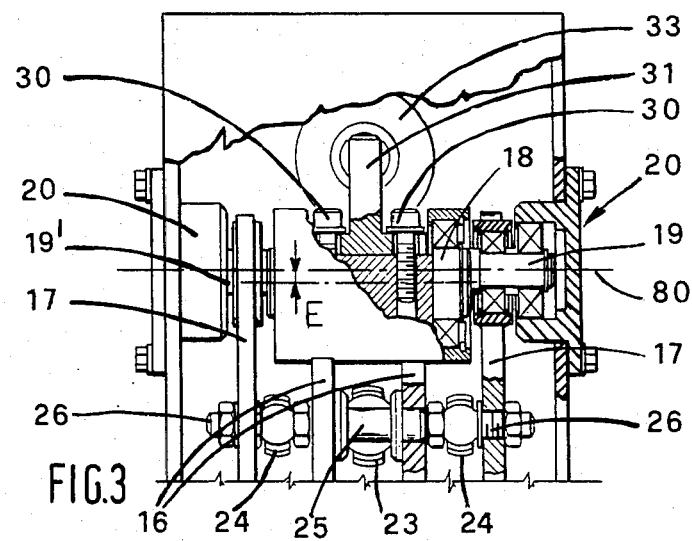

The bottom sealing control device at the station 3 comprises moving means for the scissor type sealing bars 14, 15 and is shown diagrammatically in FIGS. 2, 3 and 4. Folded material 12 is to be sealed to form a container. The sealing bars 14, 15 are located, facing each other, at a lower end portion of two pairs of arms 16, 17 freely pivoted respectively to a pin 18 and a pin 19 forming part of a crank shaft and therefore having parallel axes but their axes being eccentric between themselves to a value "E" (see FIG. 2).

The pin 19, together with a second pin 19' symmetrical to the former and making up, together with the pin 18, said crank shaft, is supported for free pivotal movement by an end bush 20 (see FIG. 3) suitably supported by a frame portion of the device. The opening and closing movement of the arms 16, 17 is carried out by means of a common or toggle type lever mechanism consisting of an element 21 pivotally mounted on the frame of the bottom sealing device in a central position. This element 21 has, at its ends, pivotted at 27, 28, a connecting rod 23 and a pair of connecting rods 24 ending respectively at the arms 16, 17 to which they are pivotted at 25, 26. The element 21 is moved by a connecting rod 29 ending, mechanically, at the driving shaft (not shown) of the packaging machine and thus is moved in phase with the operation of the packaging machine.

An arm 31 is secured to the pin 18 by means of fixing screws 30, (see FIGS. 2 and 3) which interacts against a piston rod 32 (providing pneumatically controlled damping means) of a small pneumatic piston 33 fixed to the frame of the bottom sealing device. The arm 31, at the opposite side to piston 33 contacts, in the rest position, an adjusting screw 35 which is engaged in a threaded hole of the frame portion of the device. The operation of the bottom sealing device is as follows:

When the toggle device is in the opening position (see dotted line in FIG. 2), the supporting arms 16, 17 of the sealing bars 14, 15 are in the open (dash-line) position and the strip 12 of packaging material, suitably folded as indicated above, is positioned between the sealing bars; the arms 31 is in the rest position shown in FIG. 2. Subsequently, when the connecting rod 29 transverse in the direction indicated by arrow 36 in FIG. 2, the element 21 rotates in a clockwise direction from the dash-line position until it is in the plan, full-line, position in FIG. 2, corresponding with the closure of arms 16, 17 on the material to be sealed. At this point, considering that the toggle device must be suitably adjusted so as to maintain thrust on the pivots 25, 26 even after contact between the sealing bars 14, 15 and the material to be sealed, subsequent to the contact between the sealing bars and said material, rotation of the pin 18 around the fixed axis 80 of the pin 19 occurs by virtue of their eccentricity "E". Following this, the arm 31 is subjected to a rotation in a clockwise direction so as to press against the rod 32 of the small pneumatic piston 33.

It is evident that the pressure applied by the piston 33 detemines the strength of reaction of the arm 31 and therefore the contact strength (thrust or pressure) which the sealing bars 14, 15 placed one opposite the other, exercise on the packaging material 12, to be sealed.

Release of the connecting rod 29 causes first of all a return of the pins 18, 19 into the arrangement in FIG. 2, at the striking of arm 31 on the adjusting screw 35, and thereafter an opening of the arms 16, 17.

Figure 5:
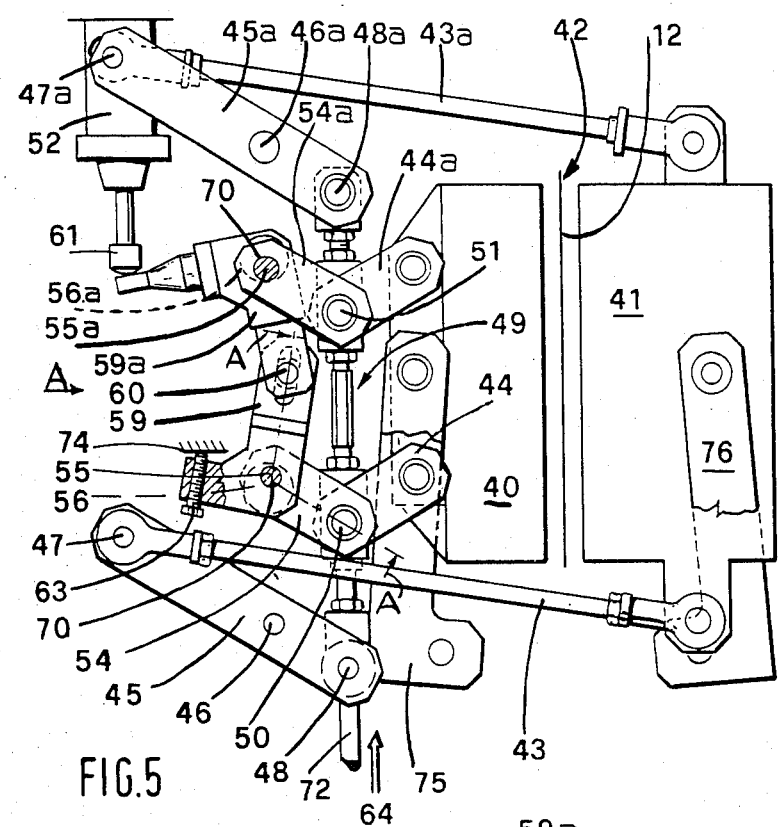
FIG. 5 is, in a different scale from that of FIGS. 2, 3 & 4, a diagrammatic side view of a lateral sealing device comprising mobile sealing bars parallel to one another.
Figure 6:
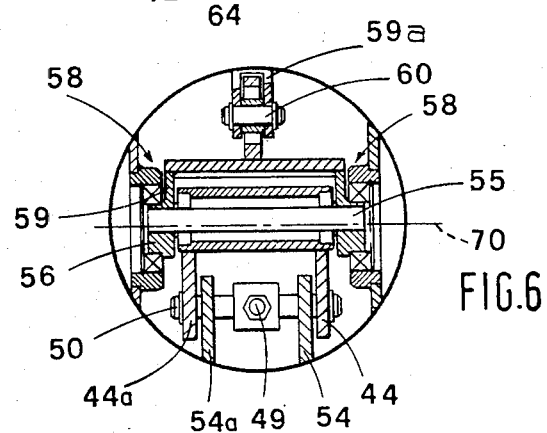
FIG. 6 shows a front view of the device shown in FIG. 5 limited to the region designated A—A of FIG. 5.

In FIGS. 5 and 6 is shown a control, sealing device for parallel sealing bars, which can be installed, for example, at the station 4 of the packaging machine shown in FIG. 1 for the sealing of the lateral edges of the containers formed by the packaging material 12.

The sealing bars, in this case arranged vertically, are indicated by numbers 40, 41, whilst the welding line is indicated by 42. The sealing bars 40, 41 are supported by pairs of arms 75, 76 pivoted on the frame of the lateral sealing device of the packaging machine. The reciprocal forward and backward movement of the bars 40, 41 is carried out by a lever mechanism comprising two pairs of connecting rods 43, 43a for the bar 41 and two pairs of connecting rods 44, 44a for the bar 40 by means of pivotal connections. The connecting rods are part of a toggle device made up of a pair of rocker arm type elements 45, 45a pivotted at 46 and 46a to the frame of the device and having the end portions respectively pivotted at 47, 47a and 48, 48a to the pairs of connecting rods 43, 43a for the sealing bar 41 and to a shaft 49 having opposite end portions pivotally connected to the rocker arm type elements 45, 45a.

The connecting rods 44, 44a for the sealing bar 40 are pivotted at 50, 51 to the shaft 49. A connecting rod 72 is also pivotted at 48 and provides driving means for the entire sealing device and is connected to the driving means of the packaging machine so that the lateral sealing device operates in phase with the packaging machine.

At the pivot points 50, 51 are also pivotted, symmetrically with the connecting rods 44, 44a relative to the shaft 49, the arms of two levers 54, 54a which, at the other end, are freely pivotted on pins 55, 55a (see also FIG. 6) which are eccentric to and integral with second pins 56, 56a freely pivotted by a pair of bushes integral with the frame of the lateral sealing device. Integral with these latter pins 56, 56a are two L/shaped levers 59, 59a, end portions of which are connected at 60. To accomplish relative pivotal movement between the pivot pins 55,55a and eccentric pins 56,56a, the free end of the lever 59a acts against a piston rod 61 (providing pneumatically controlled damping means) of a small pneumatically controlled piston 52, whilst the free end of the lever 59 is equipped with an adjusting screw 63 suitable to bear against a fixed surface of the frame of the lateral sealing device.

The working of the lateral sealing device described above is as follows: By operating the connecting rod 72 in the direction of the arrow 64 (see FIG. 5) an anticlockwise rotation of the rocking arm type elements 45, 54a is caused, with subsequent advancement (one towards the other) of the sealing bars 40 and 41 by means of all the connections given by the connecting rods 43, 43a, 44, 44a, (operated through the shaft 49 where appropriate) until they come into contact with the material to be sealed.

Similarly to the procedure described above in the case of the sealing bars with a scissor like action, of the bottom sealing device when the sealing bars 40, 41 come into contact with the packaging material 12, a further advancement of the rod 72 (and thus the shaft 49) causes a thrust on the arms of the levers 54, 54a which, acting on the pins 55, 55a, cause a partial rotation of the pins 55, 55a around the axis 70 of the pins 56, 56a which are eccentric in elation to the former pins 55, 55a. In this way there is a slight rotation of the pins 56, 56a and a rotation of the L-shaped levers 59, 59a; the lever 59a moves to press against the rod 61 of the small pneumatic piston 52, causing the pressure force of the sealing bars 40, 41 on the packing material 12. On release of the connecting rod 72 the two pins 55, 56 return into the position shown in FIG. 5 because of the striking of the adjusting screw 63 on the fixed surface 74.

By the use of two pins eccentric to one another to which the sealing bars are connected, directly or indirectly, and to which an element is connected to whose movement a pneumatically controlled device is opposed whose pressure may be calibrated in accordance with the working conditions of the machine in which the control device is inserted, a device has been produced for operating the sealing bars in packaging materials, in which the strength of contact between the sealing bars is continuously adjustable, and can be adjusted, for example, through an automatic control, movement by movement, by simply varying the pressure value inside the small pneumatic piston 33 or 52, thus matching, from time to time, the sealing characteristics with the speed of the operation of the packaging machine. Furthermore, because the movement of the sealing bars is strictly mechanical, the maintenance of the phase through the various operative stations, even allowing for different operation speeds, is absolutely assured.

The device may also have other forms besides those described above, in particular numerous modifications of a practical nature may be introduced without however exceeding the protective compass of the claims which follow. For example in one possible simplified arrangement the L-shaped levers shown in FIGS. 5 and 6 is substituted by an arm, similar to the arm 31 of the arrangement shown in FIGS. 2 and 4, integral with the pin 55a or pin 56a and the adjusting screw 63 can be engaged with the physical structure of the device and act similarly to the adjusting screw 35, whilst lever 59 can be omitted as can also be omitted lever 54. The arrangement in FIGS. 5 and 6 is however preferable to this simplified one referred to above.

Having thus described our invention, what we claim as new and desired to secure by Letters Patent of the United States is:

1. A device for controlling the movement of sealing bars of a packaging machine for packaging products in wrappers of heat-sealable material, said device comprising at least two sealing bars, a frame, a control mechanism for opening and closing said sealing bars, said control mechanism including at least two opening and closing arms, and at least two control arms first and second pins integral with each other and having axes eccentric with each other, each said sealing bar being attached to ends of a respective control arm, said control arms being pivotally mounted respectively on said first and second pins, said second pin being pivotally mounted on said frame, said first pin being rotatable about the axis of said second pin upon movement of said control arms during movement of said sealing bars toward each other, a further arm extending from one of said pins, pneumatically controlled damping means, said further arm acting on said damping means because of rotation of said first pin about the axis of said second pin following the thrust of said control mechanism as the sealing bars are closed.

2. A device according to claim 1 wherein, said control arms having a scissor-like movement and which are subjected to the action of said opening and closing arms, each control arm being freely pivoted on a respective one of said first and second pins, said pins forming a crank shaft, said further arm acts on the pneumatically controlled damping means extending from said first pin.

3. A device according to claim 2 comprising a stop adjustably mounted on the frame of the device at an opposite side of the further arm which cooperates with the penumatic damping means, said stop forming a striking element for said arm as the control mechanism begins to open said sealing bars.

4. A device for controlling the movement of sealing bars of a packaging machine for packaging products in wrappers of heat-sealable material comprising a frame, a pair of sealing bars and a control mechanism, at least one pair of first and second connecting rods, the pair of first connecting rods being connected to one sealing bar and the pair of second connecting rods to the other sealing bar, each of said first connecting rods being further connected to a rocker arm element pivoted on said frame, said rocker arm elements and said second connecting rods also being pivoted at one end to a shaft controlling the closing and opening of the sealing bars and movable in both directions along a path coinciding with its axis, said device further comprising at least one lever pivoted at one end to said shaft and at the other end to a first pin eccentric to an integral with a second pin freely pivoted on the frame of the device, and a further arm which acts on the pneumatically controlled means.

5. A device according to claim 4 comprising a pair of levers pivoted to said shaft at one end and at the other to two first pins eccentric to and integral to second pins freely pivoted on the frame of the device, two L-shaped levers being integral to the said second pins, said L-shaped levers being connected to each other for pivotal and sliding movement relative to one another, one end of one L-shaped lever acting against said pneumatically controlled means and the other L-shaped lever having an adjusting device at its free end suitable to bear against a fixed surface of the frame of the device as the sealing bars are opening.

* * * * *